United States Patent [19]

Sasaki et al.

[11] Patent Number: 5,362,535
[45] Date of Patent: Nov. 8, 1994

[54] LOCATION BOARD IN A COVERING MEMBER OF AUTOMOTIVE SEAT

[75] Inventors: Ayaru Sasaki; Youichiro Haraguchi; Shigeki Kon, all of Akishima, Japan

[73] Assignee: Tachi-S Co., Ltd., Akishimo, Japan

[21] Appl. No.: 953,656

[22] Filed: Sep. 29, 1992

[51] Int. Cl.⁵ .......................... B68G 7/12; B68G 15/00
[52] U.S. Cl. ......................................... 428/43; 428/81; 428/137; 428/192; 297/DIG. 1
[58] Field of Search ........................ 297/DIG. 1, 452; 428/81, 192, 43, 137

[56] References Cited

U.S. PATENT DOCUMENTS 4,885,828 12/1989 Kozlowski ........................ 29/91.5
5,158,634 10/1992 Kasuya ................................. 156/212

FOREIGN PATENT DOCUMENTS 62-181086 8/1987 Japan .
3-33599 4/1991 Japan .

*Primary Examiner*—Alexander S. Thomas
*Attorney, Agent, or Firm*—Oldham, Oldham & Wilson Co.

[57] ABSTRACT

A location board in a covering member of a vehicle seat, which is used in such a seat assemblage which involves bonding at least two cover sections of a covering member to a cushion member and is of such type that can be teared along the sewn jointed portion of those two cover sections for attaining a resultant seat. The location board is formed with a notched portion laying along an imaginary sewing line. In the seat assemblage, the two cover sections of covering member are sewn to one section of the location board, thus forming a series of sewing holes in the location board. The notched portion is elongated in reference to the sewing holes at such a length that permits a tearing to occur from the notched portion towards the sewing holes in a direction to prevent creation of a pointed projection at the teared edge of residual section of location board in the resultant seat at a stage of tearing off another section of the same location board.

1 Claim, 3 Drawing Sheets

LOCATION BOARD IN A COVERING MEMBER OF AUTOMOTIVE SEAT

BACKGROUND OF INVENTION

1. Field of the Invention

The present invention relates to a location board used in locating a covering member to a foam cushion member during assemblage of an automotive seat.

2. Description of Prior Art

The assemblage of an automotive seat entails bonding a covering member to the surface of a foam cushion member. There has been practiced the use of a location board for locating and retaining the covering member at a given position upon the foam cushion member, which is known, for example, from the Japanese Utility Model and Patent Laid-Open Pubs. Nos. 3-335995 and 62-181086, and the U.S. patent appln. No. 686,157. A typical conventional seat assemblage using such location board is illustrated in FIGS. 1 through 5.

FIG. 1 schematically shows the assemlbing steps for bonding a covering member (1) to the outer surfaces of a cushion member (2) by means of an upper die (5), a lower die (4) and location board (30).

As shown, the lower die (4) has a working surface formed in a shape generally conforming to the outer configuration of the foam cushion member (2), and that working surface of lower die (4) is provided with securing portions (4a). The covering member (1), which is to be secured upon this working surface of lower die (4), is formed such as to define therein a central seating cover section (11), peripheral cover sections (12)(12) sewn with the central seating cover section (11), and lateral cover section sections (13)(13). The peripheral cover sections (12)(12) are jointed at (1a) by sewing with the peripheral ends of central seating cover section (11) via a location board (3). The thus-formed cover member (1) is turned upside down and placed upon the lower die (4), with the sewn jointed portions (1a) of cover member (1) being secured in the securing portions (4a) of lower die (4). Hence, the cover member (1) exposes its reverse surface upon the lower die (4) for bonding with the foam cushion member (2). The cushion member (2) is formed such as to define therein a central seatting area (22) and a peripheral bolster areas (21)(21) surrounding the central seating area (22), each of those areas (22)(21) corresponding respectively to the central seating cover section (11) and peripheral cover sections (12). In the cushion member (2), there are formed recessed grooves (23)(23) at the respective junctures or boundaries between the central seating area (22) and peripheral bolster areas (21)(21). The flat bottom portion of the cushion member (2) is secured upon the upper die (5). Then, by lowering the upper die (5) towards the lower die (4), the outer surfaces of cushion member (2) are pressed against and bonded to the reverse surfaces of cover member (1). (of course, an adhesive has been applied to the outer surfaces of cushion member (2)) At this moment, both location boards (30) and sewn jointed portions of cover member (1) are inserted and bonded into the recessed grooves (23)(23).

With a particular reference to the location boards (3) and sewn jointed portions (1a) mentioned above, it is seen from FIGS. 2, 3 and 4 that the location board (3) is so formed as to have, defined therein, a first half part (30), a second half part (31) and a boundary line (not shown) defined those first and second half parts (30)(31). Although not shown and as known in the art, such boundary line is made smaller in thickness than the other planar area, for a cutting purpose to be explained later. Designation (33) denotes a notched portion of generally "U" shape, which is formed at the forward edge (33b) of location board (3), defining a cutting introductory point from which the two half parts (30)(31) are cut apart from each other. The notched portion (33) extends a very short distance (L2)(for instance, not more than about 3 mm) from that forward edge (33b) of location board (3) toward the inward area of the same, as viewed from FIGS. 4 and 5.

As shown in FIG. 4, one terminal end of the central seating cover section (11) and one terminal end of the peripheral cover section (12) are sewn together at the respective opposite sides of foregoing first half part (30) by two sewing threads (32)(34). In this respect, the FIG. 4 depicts the location board (3) to project from between the central and peripheral cover sections (11)(12), but as indicated by the hatching therein, those two cover sections (11) (12) are shown to be cut intentionally for the sake of highlighting the location board (3), and therefore it it to be understood that both cover sections (11) (12) expands their respective areas up to a line extending along the location board forward edge (33b).

Designation (32a) in the location board stands for an imaginary sewing line along which the sewing thread (32) is sewn to the juxtaposed three layer of central cover section (11), first half part (30) of location board (3) and peripheral cover section (12), in a manner penetrating therethrough at a given interval (L1) (corresponding to a sewing pitch of sewing machine used; say, approx. 5 mm) that can be seen from a series of equidistant resultant sewing holes (32-1, 32-2 . . . ). As viewed from FIG. 4 and 5, those sewing holes are rowed, starting from the forward edge (33b); namely from the forward edges of three juxtposed elements (3, 11, 12) and extending along the longitudinal direction of the imaginary sewing line (32a). It is noted here that the aforesaid notched portion (33) also extends along such longitudinal direction of sewing line (32a), whereupon, only at that particular notched portion (33), there are sewn directly together the two cover sections (11)(12) of covering member (1) as indicated by the first sewing hole (32-1).

Designation (33a) denotes a pull portion defined at the forward end area of location board (3), which an operator pinches with his or her fingers and pulls upwardly in the arrow direction to start tearing the second half part (31) from the first half part (30) along the line of sewing holes (32-1, 32-2, . . . ). It is appreciated that the sewing holes (32-1, 32-2, . . . ) serves as a "tear off" perforated line to make easier the separation of the second half part (31) from the first one (30).

Turning to the sewing state of those juxtaposed three layer of central cover section (11), location board (3) and peripheral cover section (12), it should be noted from FIGS. 2 and 4 that both central and peripheral cover sections (11)(12) are in the state of being turned upside down, exposing thus their respective reverse surfaces outwardly, not their frontal surfaces, which needs to be done as described earlier for seat assembling steps, and therefore as viewed from FIG. 4, the exposed surface of peripheral cover section (12) is the reverse side thereof, whereas likewise the oppositely disposed central cover section (11) exposes its reverse side to the other outward side. Thus, in FIG. 4, the frontal surfaces respectively of those two cover sections (11) face toward each other via the location board (3).

In the practical assembling steps, the above-constructed cover member (1), as turned upside down, is placed upon the lower die (4), with the second half part (31) of location board (3) being inserted into the engagement groove (4a-1) formed in the securing portion (4a) of lower die (4), as best shown in FIG. 2. Thus, both first half part (30) of location board (3) and sewn jointed portion (1a) of cover member (1) erects upon the lower die (4). Then, when the upper die (5) is lowered towards the lower die (4), those location board first half (30) and cover member jointed portion (1a) are inserted into the recessed groove (23) of cushion member (2) mentioned above, as readily understandable from FIG. 2. As a result, the reverse surfaces of cover member (1) are bonded to the outer surfaces of cushion member (22), and then, a resultant seat is again turned upside down to attain a seat with the frontal surface of cover member (1) covering the whole outer surfaces of cushion member (2), which can be seen from FIG. 3.

Since the location board first half (31) remains projected upon such resultant seat, an operator pinches with his or her fingers the pull portion (33a) of location board (3) and pulls it upwardly, as indicated by the arrow in FIG. 3, to tear the first half part (31) from the second one (30) which is bonded in the cushion member (2), along the sewing holes (32) in the location board (3). Consequently, the assembling of seat is completed.

Although having described thus far the conventional seat assembling steps, it has yet been found as a problem that, as pointed out by designation (31a) in FIG. 3 as well as in FIG. 5, an undesired pointed projection remains uncut at the notched part (33) in the location board (3), when tearing off the first half part (31) of location board (3). This projection (31a) results in giving a hard objectionable touch or a pain to the hip of occupant sitting on the above-assembled conventional seat.

To solve this problem, one can contemplate forming the notched part (33) in a straight line or in a "V" shape, but experiments thereon reveals that, with both of those alterations, the first half part (31)f of location board (3) is not cut off along the sewing holes (32a), but easily broken away from the body of location board (3) at a quite small area generally equal to the foregoing pull portion (33a) of the same location board (3). Therefore, the U-shaped notched pat (33) as illustrated is now thought to be a best mode of tearing or cuttig introductory means for starting to tear the location board first half (31) completely away from the mating second half (30) along the sewing holes (serving as the perforated holes).

SUMMARY OF THE INVENTION

As stated above, an objectionable pointed projection is created from the cut upper edge of the first half part of location board embeded in the cushion member when the second half part thereof is teared off from that first half part when pulling upwardly the pull portion of location board at a final statge of seat assemblage described above. A research was conducted by the inventor of the present invention as to the cause of this problem, and it is discovered that the notched portion of location board is very small in length (at L2) in reference to the series of sewing holes which are formed along the imaginary sewing line (32a), and this factor is attributable to the creation of such pointed projection.

In other words, at the stage of sewing together both terminal portions respectively of those two covering member sections to the first half part of location board as explained above, a series of plural sewing holes are formed equidistantly a given distance therebetween, and the notched portion in question is much shorter than such given distance, according to the prior-art location board, with the result that, at the final stage of pulling up the pull portion of location board, an upward moment is produced from the upper longitudinal edge (at 33u) of the notched portion, causing a tear to proceed therefrom adjacent the U-shaped edge of the same downwardly towards the neighboring second sewing hole (at 32-2) in a sloped way. This tear creates the pointed projection in question. It is further noticed that, in most cases, the prior-art notched portion is merely of such a length that extends only over the first sewing hole (at 32-1) towards the point adjacent the second sewing hole (32-2) and thus the foregoing first half part of location board is not retained well at that notched portion, which is additionally attributable to the creation of pointed projection.

A purpose of the present invention is therefore to provide an improved location board which solves the above-noted problem.

To achieve such purpose, a location board according to the present invention has, formed therein, an elongated notched portion which is made longer than the aforementioned given distance among the plural sewing holes.

Accordingly, such elongation of notched portion widens the pull portion of location board and extends further the spacing of notched portion along the sewing line, thereby causing the above-discussed upward moment to be produced from the lower longitudinal edge (at 33dw) in contrast to that of the prior-art location board, so that, according to the present invention, when pulling up the pull portion of location board, a tear proceeds from that lower longitudinal edge adjacent the U-shaped edge, of notched portion, upwardly towards the neighboring third sewing hole (at 32-3). Therefore, there is never formed such pointed projection at the final stage of tearing off the second half part of location board from the first one in the seat assemblage. Preferably, the notched portion may be elongated at such a length that allows two sewing bridges (at 32-1 and 32-2) of sewing thread (32) to be present in the spacing thereof, so as to firmly retain the portion of the first half part of location board which lies at that notched portion, thereby helping the upward moment to easily work from a line corresponding to the lower longitudinal edge (33dw) of notched portion.

DETAILED DESCRIPTION OF PREFERRED EMBODIMENT OF THE INVENTION

At first, it should be understood that the present invention is directed to an improvement based on the previously described prior-art location board (3) and other all associated elements of seat, that all like designations in the prior art description above correspond to all like designations to be given hereinafter, and that any specific explanation on the common parts and elements between the present invention and prior art is omitted for the sake of simplicity.

Figure 5:
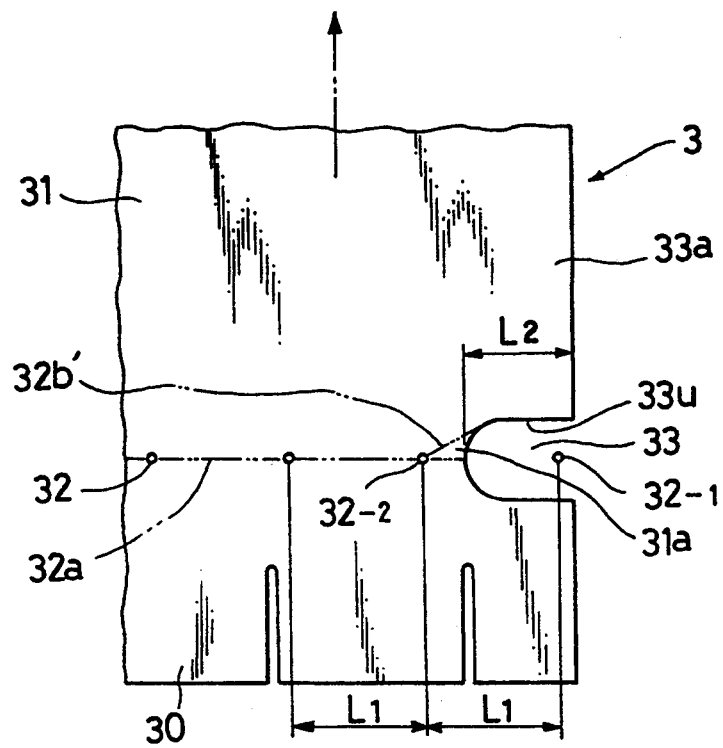
FIG. 5 is a partly broken elevation view of the conventional location board.

We, the inventors, researched the causes of the above-stated problem with the prior-art location board (3), and find that the extremely small formation of notched part (33) is a cause leading to the creation of above-noted undesired pointed projection (31a). Namely, referring to FIG. 5, according to the prior-art location board (3), the notched part (33) extends at such small distance (L2) from the forward edge of location board (3) into the body of same. The small distance (L2) is even smaller than a distance (L1) (corresponding to the sewing pitch of sewing machine used, which is not shown though, and about 5 mm as mentioned previously) between the first sewing hole (32-1) and second one (32-2) along the imaginary sewing line (32a). With this conventional design of location board (3), it has been found that when pulling up the pull portion (33a) of location board (3), a tearing proceeds from the U-shaped end of notched part (33) in a downwardly inclined direction, as indicated by the two-dot chain line under designation (32b) in FIG. 5, towards the second hole (32-2). The reason behind this tearing manner could be that an upward moment of a pulling force (as indicated by the two-dot-chain-line arrow in FIG. 5) is produced from a line corresponding to the upper longitudinal edge (33u) of notched part (33) by the reason that (i) the prior-art notched part (33) is of such very small length (L2) and (ii), as can be seen from the first sewing hole (32-1), the sewing thread (32) penetrates only one time, or presents only one sewing bridge through the jaxtaposed layer of central and peripheral cover sections (11)(12) of covering member (1) within the spacing of notched part (33). Hence, the upward moment works in relation to the adjacent second hole (32-2), thereby orienting the pulling force in the downwardly inclined direction from the notched part (33) to the second hole (32-2), which causes a tear between the U-shaped end of notched part (33) and second hole (32-2) in the same downwardly inclined direction, as indicated by the corresponding two-dot chain line in FIG. 5. Thereafter, the first half part (31) of location board is cut continuously apart from the second one (30) along the imaginary sewing line (32a). As a result thereof, the pointed projection (31a) in question is created at the region between the notched part (33) and second hole (32-2), raising the problem of giving an objectionable hard touch or pair to the hip portion of an occupant on the resultant seat.

Figure 1:
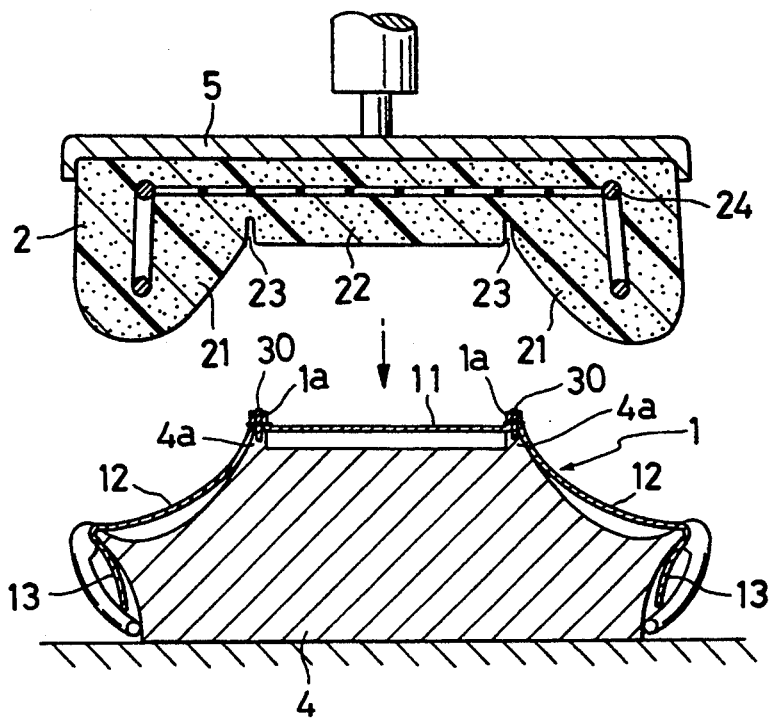
FIG. 1 is a schematic sectional view of a conventional device for assembling a seat which uses a conventional location board.
Figure 4:
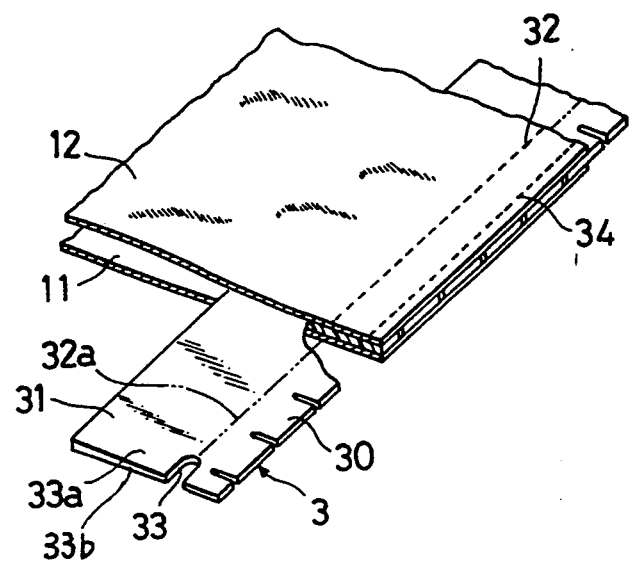
FIG. 4 is a partly broken perspective view showing a unit of location board and cover sections of a cover ing member which are sewn together.
Figure 2:
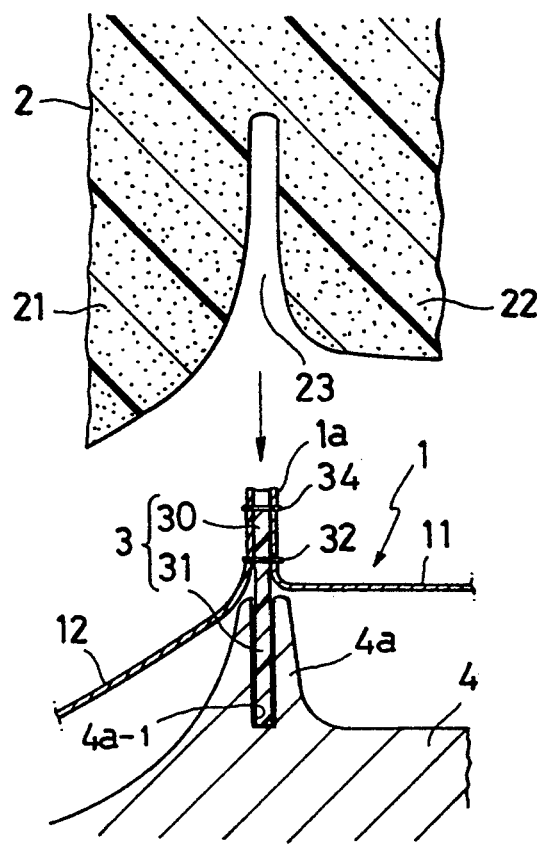
FIG. 2 is a partially enlarged view showing a principal portion in FIG. 1 and associated seat assembling step explanatorily.
Figure 3:
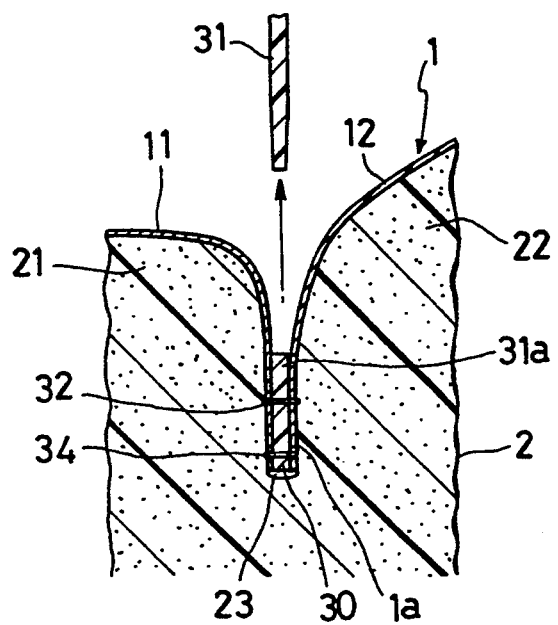
FIG. 3 is a partially enlarged view showing the principal portion in FIG. 1 and a step of tearing the location board.
Figure 6:
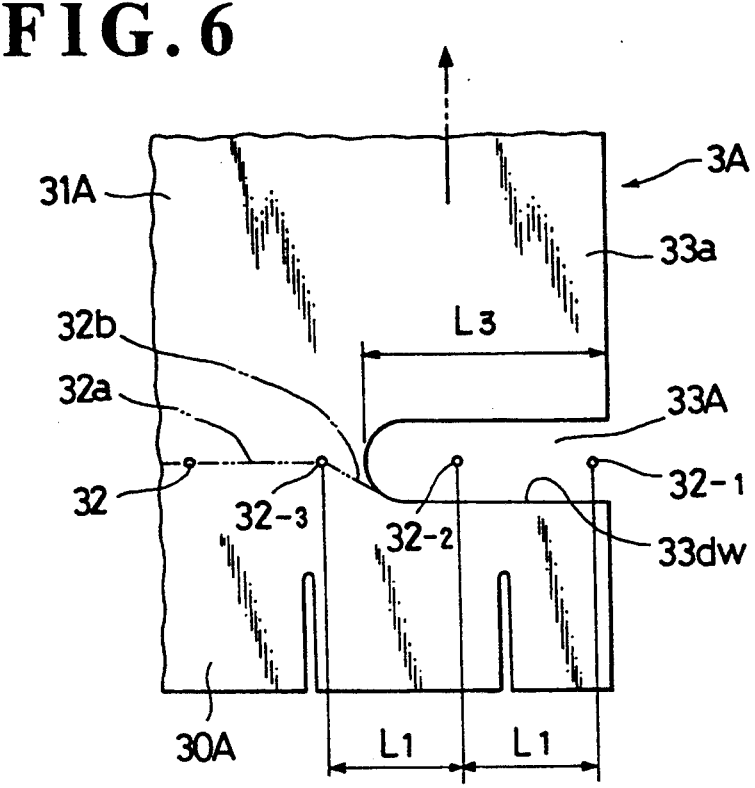
FIG. 6 is a partly broken elevation view of a location board in accordance with the present invention.

Now, reference is made to FIG. 6, which shows an emodiment of location board (3A) in accordance with the present invention. The location board (3A) is basically identical to the above-stated prior art one (3), only except that there is formed a longer notched part (33A) in the board (3A) at such a greater distance (L3) than that (L2) in the prior-art notched part (33). Specifically stated, that particular notched part (33A) extends from the first sewing hole (32-1) and passes the second sewing hole (32-2), approximating its length to a point close to a third sewing hole (32-3) in the sewing line (32a); namely, at the distance (L3) which is larger than the distance (L1) between those first and second holes (32-1)(32-2) and smaller than the doubled distance (L1+L1) between the first and third holes (32-1)(32-3). Preferably, the distance or length (L3) of foregoing notched part (33A) may be approx. 6 mm. (The heightwise width of the notched part (33A) is approx. 2 mm, for instance) By being so designed, when pulling up the pull portion (33a) of location board (3A) in the arrow direction in FIG. 6, a tearing proceeds from the U-shaped end of notched part (33A) in an upwardly inclined direction towards the adjacent third hole (32-3) as indicated by the two-dot chain line at (32b) in FIG. 6. Therefore, with this novel arrangement of location board (33A), a seat assembling is carried out in the same way and steps with those of the previously described conventional seat assemblage, and then, in the resulting seat, there is never formed such pointed projection (31a) found in the prior-art board (3) since the tearing starts in a direction reversal to that of the prior-art location board (3), leaving thus a teared edge which slopes downwardly to a level of lower longitudinal edge (33dw) of notched part (33A) embedded in the recessed groove (23) of cushion member (2), as viewed from FIG. 6 in conjunction with FIG. 3.

From the above discovery, it can be noticed that such elongation of notched part (33) as in the one (33A) serves to not only make longer the pull portion (33a), but also allow the sewing thread (32) to provide two sewing bridges (at (32-1) and (32-2)) within the spacing of the notched part (33A). Those two factors are an effective contributor to producing an upward moment from a line corresponding to the lower longitudinal edge (33dw) of notched part (33A) in contrast to the upward moment in the prior-art location board (3) which is produced from the upper edge (33u) of notched part (33). Namely, it is thought theoretically that the widened pull portion (33a) helps to disperse the pulling force so as to transfer the base point of the upward moment towards the line corresponding to the lower longitudinal edge (33dw) of notched part (33A), and that such two sewing bridges at (32-1)(32-2), which pass transversely through the spacing of notched part (33A), serve to firmly retain a part of the first location board half (30A) which lies at the notched part (33A) and thus spaced apart from the second location board half (31A), thereby causing production of upward moment from that lower edge (33dw) of notched part (33A) on the side of first location board half (30A). Therefore, the pulling force exerted on the location board (3A) is oriented in the upwardly inclined direction from the U-shaped end of notched part (33A) to the third sewing hole (32-3), as viewed from FIG. 6, so that a tear is created in the same upwardly inclined direction as indicated by the corresponding two-dot chain line (32a) in FIG. 6, to extend between the U-shaped end of notched part (33A) to the third sewing hole (32-3). Thereafter, the second location board half (31A) may be continuously cut apart from the first one (30A).

The location board (3A) is preferably made of a synthetic resin material having a somewhat elastic property.

What is claimed is:

1. A vehicle seat, comprising a cushion member, and at least two sections of a covering member each having a terminal portion, a location board facilitating the assembly of the seat including a first section, a second section and a generally U-shaped notched portion defined at one forward end of said location board;

said cushion member having a recessed groove formed therein, sewing means holding said terminal portions respectively of said at least two covering member sections so as to be fixed to said first section of said location board along a predetermined sewing line defined between said first and second sections, thereby forming a series of plural sewing holes in said location board along a longitudinal direction thereof, with said sewing holes being rowed so equidistantly as to be disposed a given distance from one other, said series of plural sewing holes forming, in turn, a tear-off line for permitting separation of said second section from said first section, wherein both said at least two sections of said covering member expose their respective reverse surfaces outwardly of said location board, with a sewn jointed portion being formed in said covering member, characterized in that:

said generally U-shaped notched portion, which extends from said forward end of said location board, is made longer than said given distance between adjacent sewing holes in a direction along substantially coincident with said tear-off line, thereby facilitating said second section to be torn off from said first section.

* * * * *